US011951652B2

(12) United States Patent
Kirkley et al.

(10) Patent No.: US 11,951,652 B2
(45) Date of Patent: Apr. 9, 2024

(54) GROUT VACUUM SYSTEMS AND METHODS

(71) Applicant: Tindall Corporation, Spartanburg, SC (US)

(72) Inventors: Kevin L. Kirkley, Woodstock, GA (US); John Michael Romano, Atlanta, GA (US); Matthew S. Alesch, Atlanta, GA (US)

(73) Assignee: Tindall Corporation, Spartanburg, SC (US)

( * ) Notice: Subject to any disclaimer, the term of this patent is extended or adjusted under 35 U.S.C. 154(b) by 217 days.

(21) Appl. No.: 17/154,320

(22) Filed: Jan. 21, 2021

(65) Prior Publication Data

US 2021/0221024 A1 Jul. 22, 2021

Related U.S. Application Data

(60) Provisional application No. 62/963,831, filed on Jan. 21, 2020.

(51) Int. Cl.
*B28B 1/24* (2006.01)
*F16K 15/03* (2006.01)
(Continued)

(52) U.S. Cl.
CPC .............. *B28B 1/24* (2013.01); *F16K 15/035* (2013.01); *F16K 15/042* (2013.01); *F04B 15/02* (2013.01)

(58) Field of Classification Search
CPC ............ B28B 1/261; B28B 1/24; F04B 15/02
See application file for complete search history.

(56) References Cited

U.S. PATENT DOCUMENTS 960,125 A 5/1910 Tresidder
1,050,130 A 1/1913 Harvey
(Continued)

FOREIGN PATENT DOCUMENTS

DE 1784807 11/1971
FR 1283969 2/1962
(Continued)

OTHER PUBLICATIONS

Office Action in connection to U.S. Appl. No. 17/239,036, dated Mar. 29, 2022.
(Continued)

*Primary Examiner* — Emmanuel S Luk
(74) *Attorney, Agent, or Firm* — Meunier Carlin & Curfman LLC (57) ABSTRACT

Various implementations include a device for pumping grout. The device includes a body and a pump. The body defines a first opening, a second opening, and a third opening. Each of the first, second, and third openings is in fluid communication with each other. The first opening includes a first one-way valve configured to allow the flow of grout toward the second and third openings, and the second opening includes a second one-way valve configured to allow the flow of grout away from the first and third openings. The pump is sealingly coupled to the third opening and in fluid communication with the first and second openings. The pump is configured to increase and decrease pressure within the body to cause the flow of grout from the first opening to the second opening.

16 Claims, 7 Drawing Sheets

(51) Int. Cl.
  *F16K 15/04* (2006.01)
  *F04B 15/02* (2006.01)

(56) References Cited

U.S. PATENT DOCUMENTS

| | | | |
|---|---|---|---|
| 1,492,642 A * | 5/1924 | Lake | B28B 1/24 |
| | | | 425/584 |
| 1,684,370 A * | 9/1928 | Schuster | B65G 53/32 |
| | | | 366/5 |
| 2,017,974 A * | 10/1935 | Kastner | F04B 7/0053 |
| | | | 417/900 |
| 2,569,669 A | 10/1951 | Henderson | |
| 2,724,261 A | 11/1955 | Rensaa | |
| 2,948,995 A | 8/1960 | Cogan | |
| 3,216,157 A | 11/1965 | Pinter | |
| 3,245,190 A | 4/1966 | Reiland | |
| 3,292,658 A * | 12/1966 | Scaramucci | F16K 15/144 |
| | | | 137/856 |
| 3,320,901 A * | 5/1967 | Koy | F04B 43/1133 |
| | | | 417/900 |
| 3,369,334 A | 2/1968 | Berg | |
| 3,540,763 A | 11/1970 | Yee | |
| 3,578,885 A * | 5/1971 | Alton | F04B 7/0275 |
| | | | 417/454 |
| 3,613,325 A | 10/1971 | Yee | |
| 3,621,626 A | 11/1971 | Tylius | |
| 3,667,869 A * | 6/1972 | Schlecht | F04B 9/1178 |
| | | | 417/539 |
| 3,696,567 A | 10/1972 | Mllaneu | |
| 3,713,259 A | 1/1973 | Tkach | |
| 3,722,159 A | 3/1973 | Kessler | |
| 3,782,061 A | 1/1974 | Minutoli | |
| 3,829,254 A * | 8/1974 | Stetter | F04B 7/0034 |
| | | | 417/900 |
| 3,913,287 A | 10/1975 | Chapman, Jr. | |
| 3,921,281 A | 11/1975 | Hattori et al. | |
| 3,965,627 A | 6/1976 | Fencl | |
| 3,971,179 A | 7/1976 | Bodocsi | |
| 4,024,688 A | 5/1977 | Calini | |
| 4,028,857 A | 6/1977 | Fischer | |
| 4,067,224 A | 1/1978 | Birks | |
| 4,075,801 A | 2/1978 | Alper | |
| 4,094,054 A | 6/1978 | Fischer | |
| 4,099,360 A | 7/1978 | Outram | |
| 4,111,327 A | 9/1978 | Janakiev | |
| 4,185,440 A | 1/1980 | Finsterwalder | |
| 4,196,557 A | 4/1980 | Silvander | |
| 4,205,029 A | 5/1980 | Forrest | |
| 4,343,598 A * | 8/1982 | Schwing | F04B 15/023 |
| | | | 417/532 |
| 4,443,985 A | 4/1984 | Moreno | |
| 4,559,691 A | 12/1985 | Mannhart et al. | |
| 4,580,954 A * | 4/1986 | Boyle | F04B 7/0092 |
| | | | 417/532 |
| 4,583,336 A | 4/1986 | Shelangoskie et al. | |
| 4,613,290 A * | 9/1986 | Evenson | F04B 15/023 |
| | | | 417/532 |
| 4,627,212 A | 12/1986 | Yee | |
| 4,634,352 A * | 1/1987 | Austin | F04B 15/023 |
| | | | 417/900 |
| 4,692,052 A | 9/1987 | Yee | |
| 4,694,621 A | 9/1987 | Locke | |
| 4,743,138 A | 5/1988 | Goy | |
| 4,819,394 A | 4/1989 | Compton | |
| 4,893,992 A * | 1/1990 | Schlecht | F04B 15/023 |
| | | | 417/900 |
| 4,913,089 A * | 4/1990 | Atkins | F04B 15/023 |
| | | | 239/69 |
| 4,951,438 A | 8/1990 | Thoresen | |
| 4,987,013 A * | 1/1991 | Atkins | F04B 49/065 |
| | | | 264/270 |
| 5,012,622 A | 5/1991 | Sato et al. | |
| 5,025,605 A | 6/1991 | Sekijima et al. | |
| 5,030,052 A | 7/1991 | Anderson et al. | |
| 5,050,364 A | 9/1991 | Johnson et al. | |
| 5,090,172 A | 2/1992 | Chana et al. | |
| 5,123,220 A | 6/1992 | Simenoff | |
| 5,152,118 A | 10/1992 | Lancelot | |
| 5,253,460 A | 4/1993 | Simenoff | |
| 5,261,198 A | 11/1993 | McMillian | |
| 5,289,626 A | 3/1994 | Mochida et al. | |
| 5,305,573 A | 4/1994 | Baumann | |
| 5,308,184 A | 5/1994 | Bernard | |
| 5,336,052 A * | 8/1994 | Zollner | F04B 15/02 |
| | | | 417/205 |
| 5,340,512 A * | 8/1994 | Slocum | B29B 7/7476 |
| | | | 425/408 |
| 5,366,672 A | 11/1994 | Albrigo et al. | |
| 5,383,740 A | 1/1995 | Lancelot, III | |
| 5,392,580 A | 2/1995 | Baumann | |
| 5,410,847 A | 5/1995 | Okawa | |
| 5,561,956 A | 10/1996 | Englekirk et al. | |
| 5,606,839 A | 3/1997 | Baumann | |
| 5,625,987 A | 5/1997 | Zamerovsky | |
| 5,660,594 A | 8/1997 | Viljakainen | |
| 5,690,478 A * | 11/1997 | Zollner | F04B 15/02 |
| | | | 417/539 |
| 5,732,525 A | 3/1998 | Mochizuki et al. | |
| 5,974,761 A | 11/1999 | Mochizuki et al. | |
| 6,003,281 A | 12/1999 | Pilakoutas | |
| 6,065,263 A | 5/2000 | Taguchi | |
| 6,176,061 B1 | 1/2001 | Smith | |
| 6,195,949 B1 | 3/2001 | Schuyler | |
| 6,212,847 B1 | 4/2001 | Park | |
| 6,286,270 B1 | 9/2001 | Gruson et al. | |
| 6,295,770 B1 | 10/2001 | Sheu | |
| 6,192,647 B1 | 12/2001 | Dahl | |
| 6,327,829 B1 | 12/2001 | Taguchi | |
| 6,381,912 B1 | 5/2002 | Sorkin | |
| 6,550,816 B1 | 4/2003 | Sorkin | |
| 6,622,442 B2 | 9/2003 | Kwon | |
| 6,631,592 B1 | 10/2003 | Hancock | |
| 6,647,678 B1 | 11/2003 | Zambelli et al. | |
| 6,735,994 B2 | 5/2004 | Buhler et al. | |
| 6,827,520 B2 | 12/2004 | Reichartz | |
| 6,880,224 B2 | 4/2005 | Colarusso et al. | |
| 6,883,998 B2 | 4/2005 | Bullivant | |
| 7,010,891 B1 | 3/2006 | Clark et al. | |
| 7,934,345 B2 | 5/2011 | Marsh et al. | |
| 7,934,347 B2 | 5/2011 | Brienen | |
| 7,938,379 B2 | 5/2011 | Baten | |
| 8,359,797 B2 | 1/2013 | Lee | |
| 8,375,678 B1 | 2/2013 | Ferrer | |
| 8,656,680 B2 | 2/2014 | James | |
| 8,826,627 B2 | 9/2014 | Hongo | |
| 8,943,776 B2 | 2/2015 | Strickland et al. | |
| 8,973,317 B2 | 3/2015 | Larkin | |
| 9,057,170 B2 | 6/2015 | Tadros et al. | |
| 9,243,398 B2 | 1/2016 | Liberman | |
| 9,249,817 B2 | 2/2016 | Imai et al. | |
| 9,404,254 B2 | 8/2016 | Reigstad | |
| 9,404,258 B2 | 8/2016 | Yun et al. | |
| 9,410,316 B2 | 8/2016 | Reigstad | |
| 9,410,320 B2 | 8/2016 | Murata | |
| 9,410,322 B1 | 8/2016 | Du et al. | |
| 9,534,411 B2 | 1/2017 | Kurosawa | |
| 9,553,374 B1 | 1/2017 | Murugiah | |
| 9,644,369 B2 | 5/2017 | Reigstad | |
| 9,671,144 B1 * | 6/2017 | El-Shaarawi | F25B 41/24 |
| 9,677,274 B2 | 6/2017 | Saiidi | |
| 9,840,844 B2 | 12/2017 | Prowse | |
| 10,378,199 B2 | 8/2019 | Calderon et al. | |
| 10,465,374 B2 | 11/2019 | Sugaya et al. | |
| 10,538,910 B2 | 1/2020 | Espinosa | |
| 10,829,934 B2 | 11/2020 | Louw | |
| 10,954,684 B2 | 3/2021 | Rudlinger | |
| 11,629,707 B2 * | 4/2023 | Keijers | F04B 9/117 |
| | | | 417/375 |
| 2004/0045605 A1 * | 3/2004 | Floh | F16K 7/075 |
| | | | 137/512.15 |
| 2004/0182016 A1 | 9/2004 | Locke | |
| 2007/0251169 A1 | 11/2007 | Dahl | |
| 2007/0261356 A1 | 11/2007 | Vaughn | |

(56) References Cited

U.S. PATENT DOCUMENTS

| | | | |
|---|---|---|---|
| 2008/0105195 A1* | 5/2008 | Vaerewyck | B27K 3/105 |
| | | | 118/313 |
| 2008/0222976 A1 | 9/2008 | Liskey | |
| 2008/0236090 A1 | 10/2008 | Liberman | |
| 2009/0022545 A1 | 1/2009 | Koivunen | |
| 2009/0094915 A1 | 4/2009 | Liberman | |
| 2011/0061336 A1 | 3/2011 | Thomas | |
| 2011/0287119 A1* | 11/2011 | Fellabaum | B29C 48/07 |
| | | | 425/113 |
| 2011/0308198 A1 | 12/2011 | Comeford | |
| 2012/0110928 A1 | 5/2012 | Liberman | |
| 2012/0210656 A1 | 8/2012 | Hernandez et al. | |
| 2012/0279424 A1* | 11/2012 | Fork | B01F 33/70 |
| | | | 366/19 |
| 2014/0123573 A1 | 5/2014 | Fransworth | |
| 2015/0176278 A1 | 6/2015 | Reigstad | |
| 2016/0097199 A1 | 4/2016 | Saiidi | |
| 2016/0123483 A1* | 5/2016 | Fudge | F16K 15/063 |
| | | | 137/512 |
| 2017/0051495 A1 | 2/2017 | Zavitz | |
| 2017/0175376 A1 | 6/2017 | Calderon et al. | |
| 2017/0204608 A1 | 7/2017 | Yang et al. | |
| 2017/0247844 A1 | 8/2017 | Saiidi | |
| 2017/0356177 A1 | 12/2017 | Lee et al. | |
| 2018/0071949 A1* | 3/2018 | Giles | B28B 1/001 |
| 2018/0119830 A1* | 5/2018 | Graham | F16K 17/04 |
| 2020/0406500 A1* | 12/2020 | Pope | B28C 5/1253 |

FOREIGN PATENT DOCUMENTS

| | | |
|---|---|---|
| FR | 2349009 | 11/1977 |
| FR | 2438719 | 5/1980 |
| FR | 2491977 | 4/1982 |
| GB | 1086942 | 10/1967 |
| GB | 2503228 | 12/2013 |
| JP | 2009091873 | 4/2009 |
| JP | 2009281102 | 12/2009 |
| JP | 2011169058 | 9/2011 |
| KR | 101451168 | 10/2014 |
| WO | 2014118713 | 8/2014 |
| WO | 2016111513 | 4/2016 |
| WO | 2017031136 | 2/2017 |

OTHER PUBLICATIONS

International Search Report and Written Opinion issued for International Application No. PCT/US2018/018391, dated May 4, 2018.
International Search Report and Written Opinion issued for International Application No. PCT/US2016/047228, dated Nov. 15, 2016.
Extended European Search Report issued in European Application No. 16837712, dated Mar. 26, 2019, 8 pages.
Examiner's Report received in connection with Canadian Application No. 2,995,640, dated Jul. 5, 2023, 4 pages.

* cited by examiner

GROUT VACUUM SYSTEMS AND METHODS

CROSS-REFERENCE TO RELATED APPLICATIONS

This application claims the benefit of U.S. Provisional Patent Application No. 62/963,831, filed Jan. 21, 2020, the contents of which are incorporated herein by reference in their entirety.

BACKGROUND

Conventional methods and apparatuses for constructing a structure with precast components including grout sleeves require a labor-intensive effort to individually fill large numbers of grout sleeves with an adhesive such as grout. Additionally, although some current systems allow for filling multiple grout sleeves simultaneously, the grout sleeves in these systems are susceptible to clogs as the grout sleeves are filled with the adhesive.

Thus, there is a desire for a more efficient and reliable method and apparatus for connecting precast components including grout sleeves.

SUMMARY

Various implementations include a device for pumping grout. The device includes a body and a pump. The body defines a first opening, a second opening, and a third opening. Each of the first, second, and third openings is in fluid communication with each other. The first opening includes a first one-way valve configured to allow the flow of grout toward the second and third openings, and the second opening includes a second one-way valve configured to allow the flow of grout away from the first and third openings. The pump is sealingly coupled to the third opening and in fluid communication with the first and second openings. The pump is configured to increase and decrease pressure within the body to cause the flow of grout from the first opening to the second opening.

In some implementations, the pump causes the grout to flow from the first opening to the third opening when the pump decreases pressure within the body, and the pump causes the grout to flow from the third opening to the second opening when the pump increases pressure within the body.

In some implementations, the first one-way valve and the second one-way valve are swing check valves. In some implementations, the first one-way valve and the second one-way valve are ball check valves. In some implementations, the first one-way valve and the second one-way valve are lift check valves.

In some implementations, the pump is coupled to a first end of a pump tube and the third opening is coupled to a second end of the pump tube.

Various other implementations include a grout pump system. The system includes a first concrete element, a second concrete element, and a device for pumping grout, such as the device for pumping grout described above. The first opening of the device is couplable to the grout port to cause the flow of grout through the channel, through the grout port, and into the first opening of the device.

In some implementations, the pump causes the grout to flow from the first opening to the third opening when the pump decreases pressure within the body, and the pump causes the grout to flow from the third opening to the second opening when the pump increases pressure within the body.

In some implementations, the first one-way valve and the second one-way valve are swing check valves. In some implementations, the first one-way valve and the second one-way valve are ball check valves. In some implementations, the first one-way valve and the second one-way valve are lift check valves.

In some implementations, the system further includes a pump tube having a first end and a second end opposite and spaced apart from the first end. The pump is couplable to the first end of the pump tube and the third opening of the device is couplable to the second end of the pump tube.

In some implementations, the system further includes a check valve device having a first end and a second end opposite and spaced apart from the first end. The check valve allows the flow of grout from the first end to the second end. The grout port is couplable to the first end of the check valve device, and the first opening of the device is removably couplable to the second end of the check valve device.

In some implementations, the system further includes an outlet tube having a first end and a second end opposite and spaced apart from the first end. The first end is couplable to the second opening of the device.

Various other implementations include a method of using a grout pump system. The method includes positioning a first concrete element adjacent a second concrete element. The first concrete element includes an embedded grout sleeve and a grout port. The grout sleeve defines a channel, and the grout port is in fluid communication with the channel. The second concrete element includes a rod extending from the second concrete element. The rod is disposed within the channel of the grout sleeve, and a joint is defined between adjacent faces of the first and second concrete elements.

The method further includes at least partially filling the joint with grout and coupling a device for pumping grout to the grout port of the first concrete element, such as the device for pumping grout described above. The first opening of the device is coupled to the grout port, and the pump is actuated to increase and decrease the pressure within the body to cause the flow of grout from the joint, through the channel, through the grout port, and into the first opening of the device.

In some implementations, the pump causes the grout to flow from the first opening to the third opening when the pump decreases pressure within the body, and the pump causes the grout to flow from the third opening to the second opening when the pump increases pressure within the body.

In some implementations, the first one-way valve and the second one-way valve are swing check valves. In some implementations, the first one-way valve and the second one-way valve are ball check valves. In some implementations, the first one-way valve and the second one-way valve are lift check valves.

In some implementations, the pump is coupled to a first end of a pump tube and the third opening is coupled to a second end of the pump tube.

In some implementations, coupling a device for pumping grout to the grout port of the first concrete element further includes coupling the grout port to a first end of a check valve device, and removably coupling the first opening of the device to a second end of the check valve device. The second end of the check valve device is opposite and spaced apart from the first end, and the check valve allows the flow of grout from the first end to the second end.

In some implementations, the method further includes, after activating the pump, decoupling the first opening of the device from the second end of the check valve device.

In some implementations, the method further includes an outlet tube having a first end and a second end opposite and spaced apart from the first end. The first end is couplable to the second opening of the device.

In some implementations, grout flowing from the second opening of the device flows into the joint.

BRIEF DESCRIPTION OF DRAWINGS

Example features and implementations are disclosed in the accompanying drawings. However, the present disclosure is not limited to the precise arrangements and instrumentalities shown. Similar elements in different implementations are designated using the same reference numerals.

DETAILED DESCRIPTION

The devices, systems, and methods disclosed herein provide for pumping grout through grout sleeves included in a first precast component to couple the first precast component to a second precast component. The device for pumping grout is coupled to a grout port that is in fluid communication with a channel defined by a grout sleeve. The device is actuated to cause grout to flow from a joint defined between the first and second concrete elements and through the grout sleeve to ensure that the grout sleeve is filled with grout.

For example, various implementations include a device for pumping grout. The device includes a body and a pump. The body defines a first opening, a second opening, and a third opening. Each of the first, second, and third openings is in fluid communication with each other. The first opening includes a first one-way valve configured to allow the flow of grout toward the second and third openings, and the second opening includes a second one-way valve configured to allow the flow of grout away from the first and third openings. The pump is sealingly coupled to the third opening and in fluid communication with the first and second openings. The pump is configured to increase and decrease pressure within the body to cause the flow of grout from the first opening to the second opening.

Various other implementations include a grout pump system. The system includes a first concrete element, a second concrete element, and a device for pumping grout, such as the device for pumping grout described above. The first opening of the device is couplable to the grout port to cause the flow of grout through the channel, through the grout port, and into the first opening of the device.

Various other implementations include a method of using a grout pump system. The method includes positioning a first concrete element adjacent a second concrete element. The first concrete element includes an embedded grout sleeve and a grout port. The grout sleeve defines a channel, and the grout port is in fluid communication with the channel. The second concrete element includes a rod extending from the second concrete element. The rod is disposed within the channel of the grout sleeve, and a joint is defined between adjacent faces of the first and second concrete elements.

The method further includes at least partially filling the joint with grout and coupling a device for pumping grout to the grout port of the first concrete element, such as the device for pumping grout described above. The first opening of the device is coupled to the grout port, and the pump is actuated to increase and decrease the pressure within the body to cause the flow of grout from the joint, through the channel, through the grout port, and into the first opening of the device.

Figure 1A:
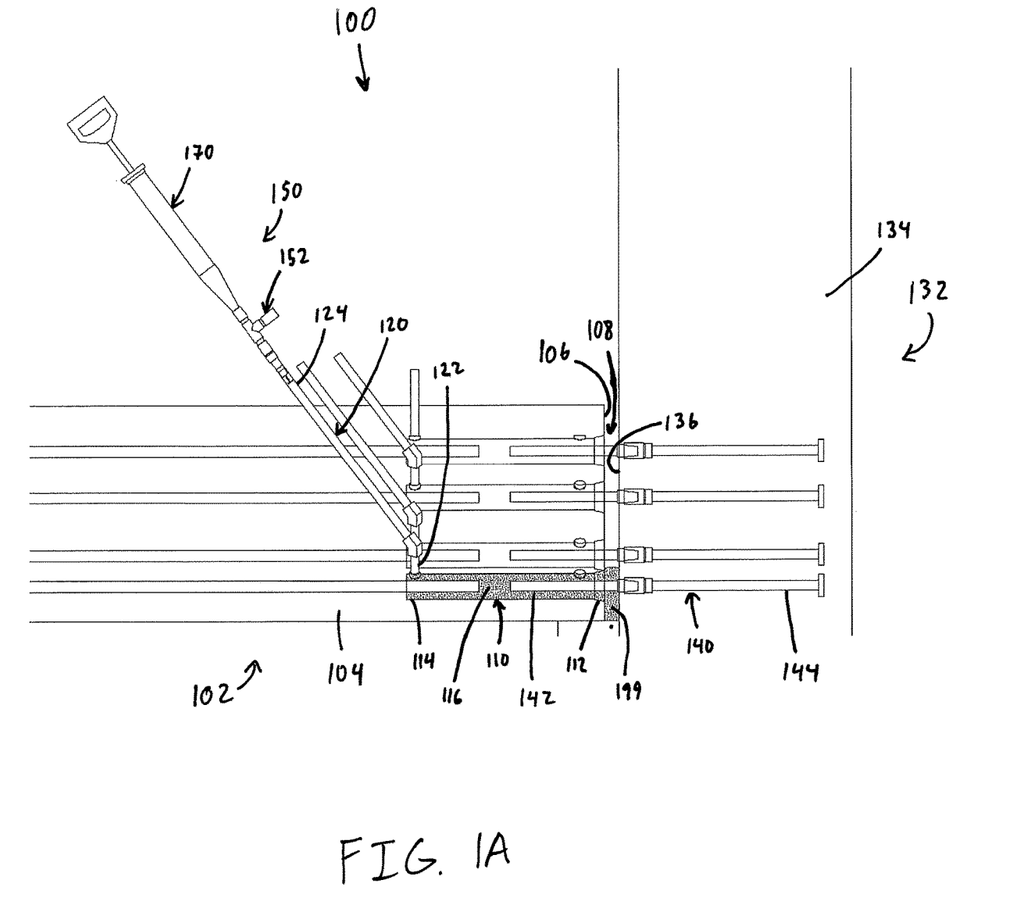
FIG. 1A is a side view a grout pump system including a first concrete element, a second concrete element, and a device for pumping grout.
Figure 1B:
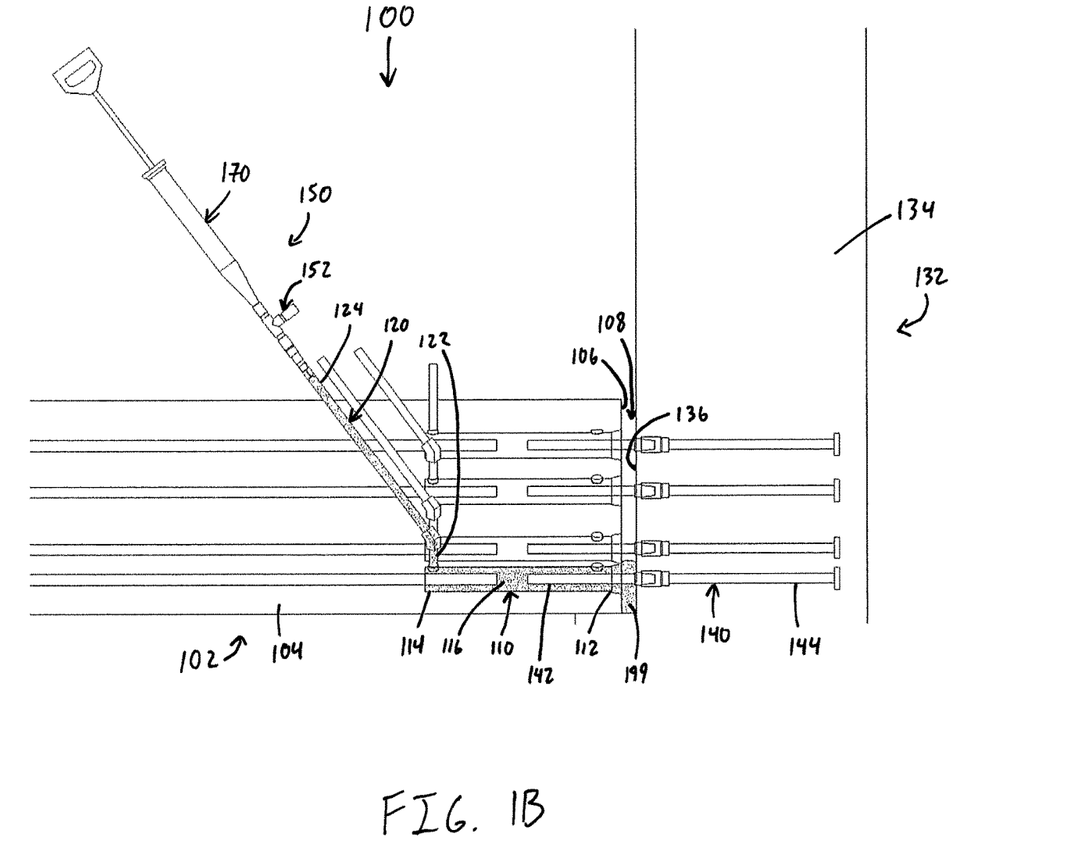
FIG. 1B is a side view the grout pump system of FIG. 1A wherein device for pumping grout has been actuated to decrease the pressure within the device.

FIGS. 1A and 1B show an example system 100 that includes a first concrete element 102, a second concrete element 132, and a device 150 for pumping grout 199. The first concrete element 102 includes a first body 104 having a first joining surface 106. A plurality of grout sleeves 110 are embedded within the first body 104 of the first concrete element 102. The plurality of grout sleeves 110 each have a first end 112 disposed at the joining surface 106 of the first concrete element 102 and a second end 114 opposite and spaced apart from the first end 112. Each of the grout sleeves 110 defines a channel 116 extending from the first end 112 of the grout sleeve 110 to the second end 114 of the grout sleeve 110 such that the channel 116 is in fluid communication with the exterior of the first concrete element 102.

The first concrete element 102 further includes a plurality of grout ports 120 each having a first end 122 and a second end 124 opposite and spaced apart from the first end 122 of the grout port 120. The first end 122 of each grout port 120 is in fluid communication with the channel 116 of a respective one of the grout sleeves 110, and the second end 124 of each grout port 120 extends to the exterior of the first concrete element 102.

The second concrete element 132 includes a second body 134 having a second joining surface 136. The second concrete element 132 includes a plurality of rods 140 each having a first portion 142 and a second portion 144 axially spaced apart from the first portion 142 of the rod 140. The second portion 144 of each of the rods 140 is embedded in the second body 134 of the second concrete element 132, and the first portion 142 of each of the rods 140 extends from the second joining surface 136 and is disposed externally to the second body 134 of the second concrete element 132.

The first concrete element 102 and the second concrete element 132 are disposed such that a joint 108 is defined between the first joining surface 106 and the second joining surface 136. Each of the rods 140 extending from the second body 134 of the second concrete element 132 is disposed within a respective channel 116 of one of the grout sleeves 110 disposed within the first body 104 of the first concrete element 102.

Although the first concrete element 102 shown in FIGS. 1A and 1B includes a plurality of grout sleeves 110 and the second concrete element 132 includes a plurality of rods 140, in other implementations, the first concrete element includes the plurality of rods and the second concrete element includes the plurality of grout sleeves. The first concrete element 102 in FIGS. 1A and 1B includes a plurality of grout sleeves 110, but in other implementations, the first concrete element includes only one grout sleeve or rod or any number of grout sleeves or rods. The second concrete element 132 in FIGS. 1A and 1B includes a plurality of rods 140, but in other implementations, the second concrete element includes only one rod or grout sleeve or any number of rods or grout sleeves. The first concrete element 102 and the second concrete element 132 shown in FIGS. 1A and 1B are precast concrete elements, but in other implementations, the first concrete element and the second concrete element are poured-in-place concrete elements.

Figure 2A:
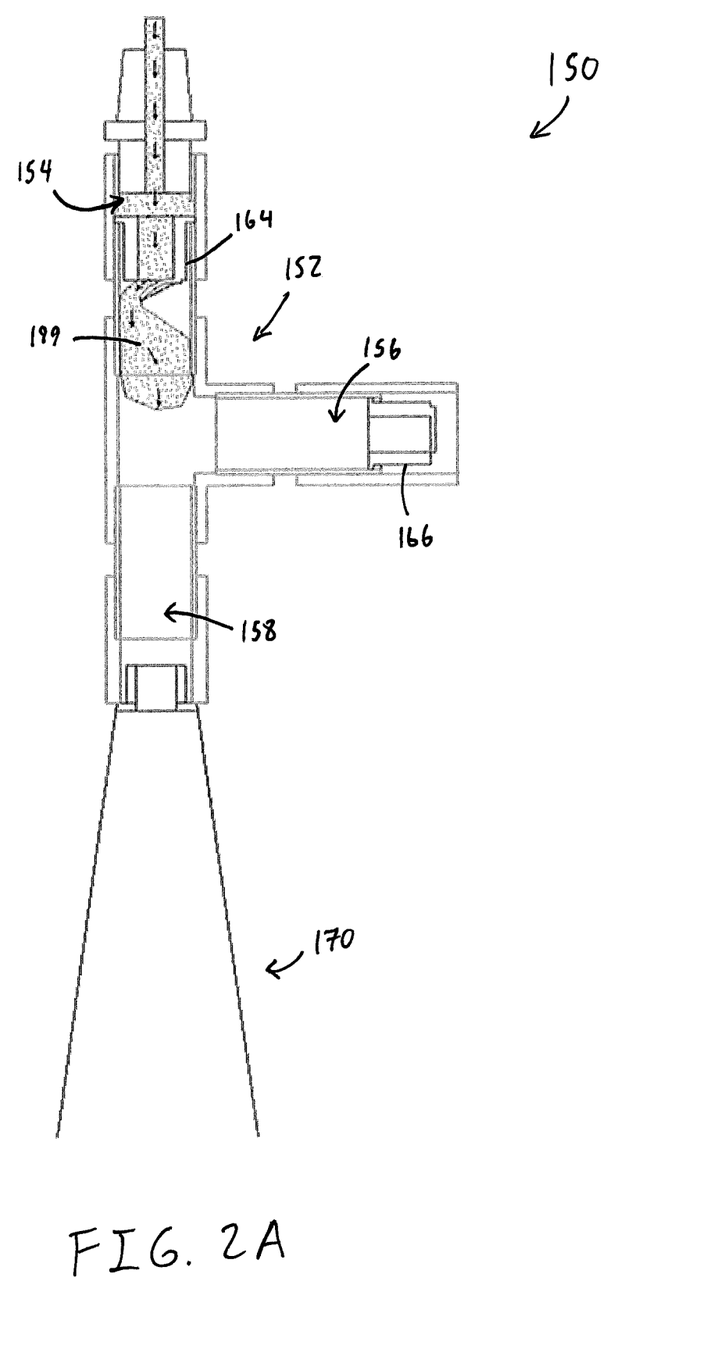
FIG. 2A is a side view of the device for pumping grout of FIG. 1A wherein the pump of the device has decreased the pressure within the body of the device.
Figure 2B:
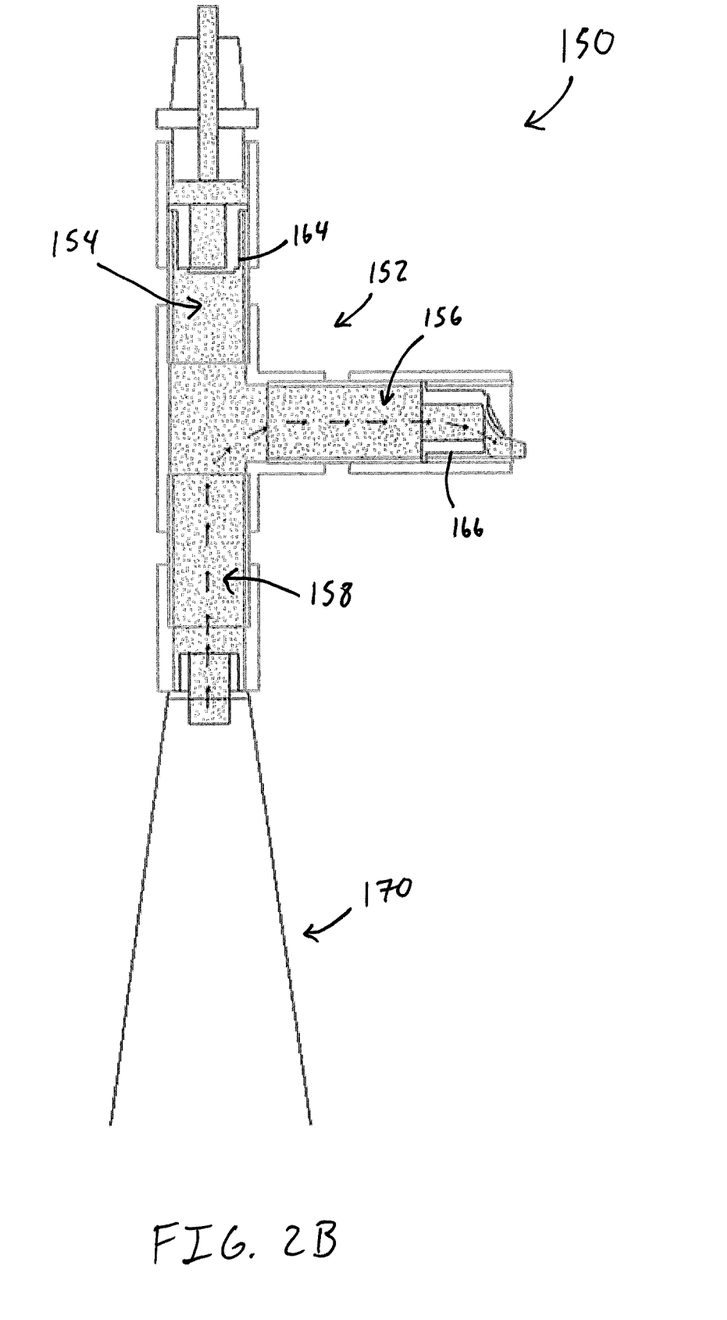
FIG. 2B is a side view of the device for pumping grout of FIG. 1A wherein the pump of the device has increased the pressure within the body of the device.

As shown in FIGS. 1A and 1B, device 150 for pumping grout 199 is coupled to the second end 124 of the grout port 120. FIGS. 2A and 2B show a detail view of the device 150 for pumping grout 199 shown in FIGS. 1A and 1B. The device 150 includes a body 152 and a pump 170.

The body 152 of the device 150 defines a first opening 154, a second opening 156, and a third opening 158. Each of the first opening 154, second opening 156, and third opening 158 extend into the body 152 of the device 150 to intersect each other such that the first opening 154, second opening 156, and third opening 158 are in fluid communication with each other. The first opening 154 of the body 152 of the device 150 is removably coupled to the second end 124 of the grout port 120. The first opening 154 of the body 152 of the device 150 shown in FIGS. 1A and 1B is directly coupled to the second end 154 of the grout port 120, but in some implementations, the first opening of the body of the device is coupled to the second end of the grout port by a pump tube. The pump tube has a first end and a second end opposite and spaced apart from the first end of the pump tube. The grout port is removably couplable to the first end of the pump tube and the first opening of the body of the device is removably couplable to the second end of the pump tube.

The first opening 154 includes a first one-way valve 164 configured to allow the flow of grout 199 toward the second opening 156 and third opening 158. The second opening 156 includes a second one-way valve 166 configured to allow the flow of grout 199 away from the first opening 154 and third opening 158. The first one-way valve 164 and the second one-way valve 166 shown in FIGS. 2A and 2B are both swing check valves, but in other implementations, the first one-way valve and second one-way valve are ball check valves, lift check valves, or any other type of one-way or check valve capable of allowing the flow of grout in one direction and preventing the flow of grout in the opposite direction. In some implementations, the first one-way valve and the second one-way valve are different types of one-way valves.

The pump 170 is sealingly coupled to the third opening 158 of the body 152 of the device 150 such that the pump 170 is in fluid communication with the first opening 154 and second opening 156. The pump 170 is configured to increase and decrease pressure within the body 152 of the device 150 to cause the flow of grout 199 from the first opening 154 of the body 152 of the device 150 to the second opening 156 of the body 152 of the device 150.

Figure 3:
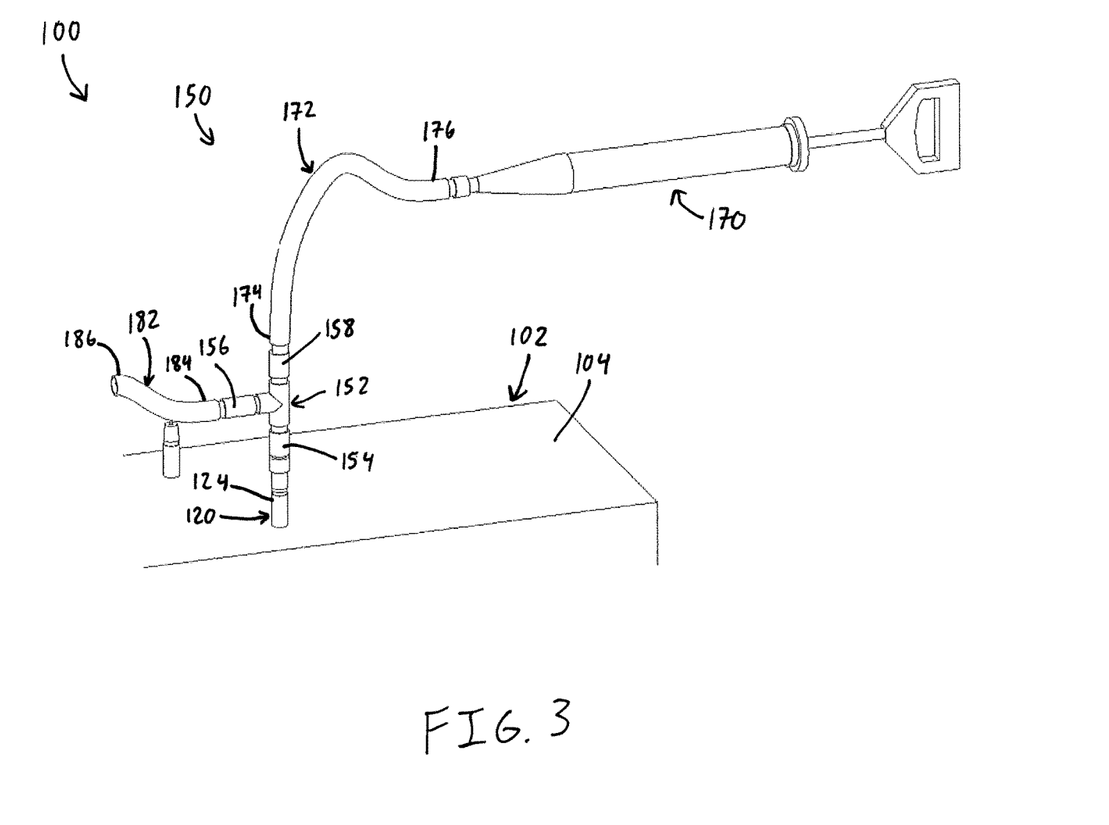
FIG. 3 is a side view the grout pump system of FIG. 1A further including a pump tube and an outlet tube.

The pump 170 shown in FIGS. 1A and 1B is directly coupled to the third opening 158 of the body 152 of the device 150, but in the implementation shown in FIG. 3, the pump 170 is coupled to the third opening 158 of the body 152 of the device 150 by a pump tube 172. As discussed above, the pump tube 172 has a first end 174 and a second end 176 opposite and spaced apart from the first end 174 of the pump tube 172. The third opening 158 of the body 152 of the device 150 is removably couplable to the first end 174 of the pump tube 172 and the pump 170 is removably couplable to the second end 176 of the pump tube 172.

As shown in FIGS. 1A and 1B, the pump 170 is a piston-cylinder hand pump, but in other implementations, the pump is any other type of pump capable of increasing and decreasing the pressure within the body of the device to cause the flow of grout through the first concrete element and through the device.

In use, the joint 108 defined by the first joining surface 106 of the first concrete element 102 and the second joining surface 136 of the second concrete element 132 is at least partially filled with grout 199 such that the grout 199 at least covers the opening of the channel 116 defined by the first end 112 of the grout sleeve 110. As shown in FIG. 1A, the first opening 154 of the body 152 of the device 150 is coupled to the second end 124 of the grout port 120. When the pump 170 is actuated to decrease the pressure within the body 152 of the device 150, as shown in FIG. 1B, the relatively low pressure within the body 152 of the device 150 causes the flow of grout 199 from the joint 108, through the grout sleeve 110, through the grout port 120, and into the first opening 154 of the body 152 of the device 150. As the grout 199 fills the grout sleeve 110, the grout 199 surrounds the first portion 142 of the rod 140 of the second concrete element 132 that is extending into and disposed within the grout sleeve 110. The pump 170 may need to be actuated to increase, and then again decrease, the pressure within the body 152 of the device 150, as shown in FIGS. 1A and 1B, to cause the grout 199 to flow the full distance from the joint 108 to the first opening 154 of the body 152 of the device 150.

FIG. 2A shows the device 150 when the pump 170 is actuated to decrease the pressure within the body 152 of the device 150. As the grout 199 flows through the first opening 154 of the body 152 of the device 150, the first one-way valve 164 is opened to allow the flow of grout 199 toward the third opening 158 and the pump 170. Because of the orientation of the second one-way valve 166, the decreased pressure within the body 152 of the device 150 causes the second one-way valve 166 to remain closed. Thus, the grout 199 flows from the first opening 154 toward the third opening 158, and a portion of the grout 199 may flow into the pump 170.

FIG. 2B shows the device 150 when the pump 170 is actuated to increase the pressure within the body 152 of the device 150. The increased pressure causes the grout 199 to flow from the third opening 158 and pump 170 toward the second opening 156. As the grout 199 flows toward the second opening 156 of the body 152 of the device 150, the second one-way valve 166 is opened to allow the flow of grout 199 through the second opening 156. Because of the orientation of the first one-way valve 164 disposed within the first opening 154, the increased pressure within the body 152 of the device 150 causes the first one-way valve 164 to remain closed. Thus, the grout 199 flows from the third opening 158 and pump 170, through the second opening 156, and out of the device 150. The activation of the pump 170 to repeatedly increase and decrease the pressure within the body 152 of the device 150 causes the flow of grout 199 from the joint 108, through the channel 116 of the grout sleeve 110, through the grout port 120, and through the device 150. This process is continued until the grout sleeve 110 within the first concrete element 102 is filled with grout 199.

Although the system shown in FIGS. 1A-2B includes grout 199, in other implementations, the system includes any adhesive that can fill the joint and can be caused to flow from the joint and through the grout sleeve.

As shown in FIG. 3, an outlet tube 182 can be removably coupled to the second opening 156 of the body 152 of the device 150. The outlet tube 182 has a first end 184 and a second end 186 opposite and spaced apart from the first end 184 of the outlet tube 182. The first end 184 of the outlet tube 182 is removably couplable to the second opening 156 of the body 152 of the device 150. When the pump 170 is actuated to cause grout 199 to flow out of the second opening 156, the outlet tube 182 can be used to direct the grout 199 exiting the device 150 through the second opening 156 into a reservoir, back into the joint 108, or to any other desired location.

Figure 4A:
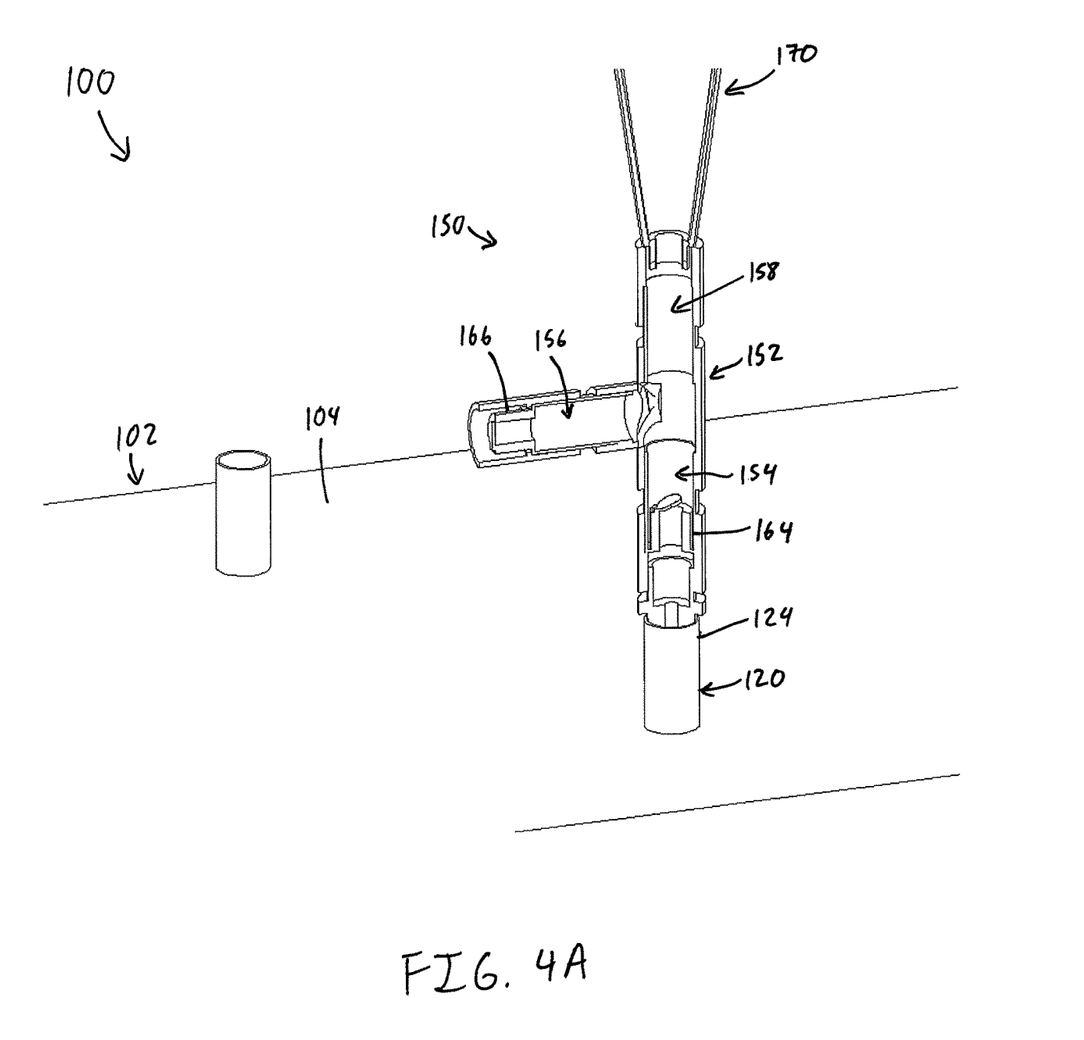
FIG. 4A is a detail side view the grout pump system of FIG. 1A wherein the device is directly coupled to the grout port of the first concrete element.
Figure 4B:
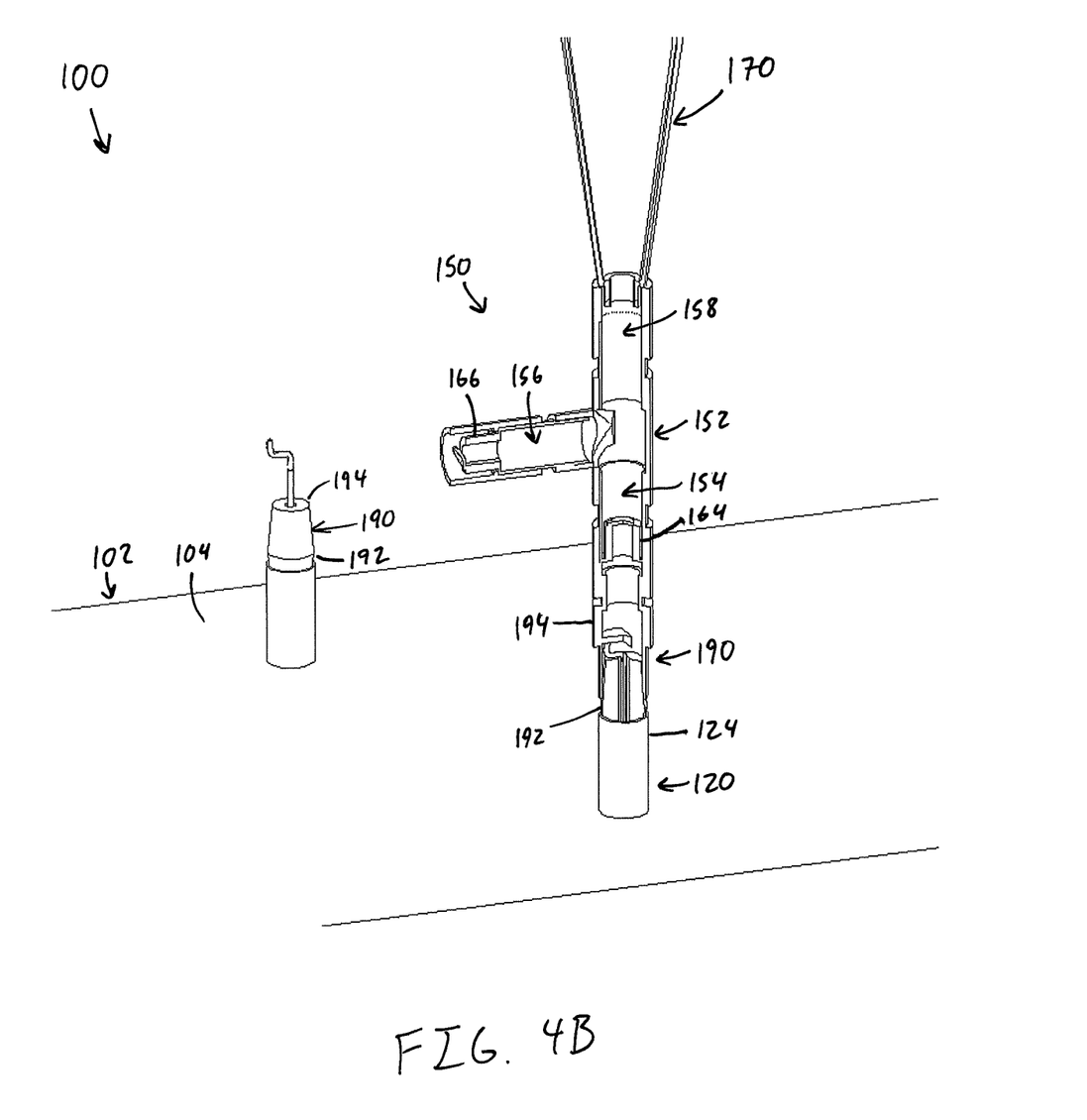
FIG. 4B is a detail side view the grout pump system of FIG. 1A wherein the device is coupled to the grout port of the first concrete element via a check valve device.

FIG. 4A shows the coupling of the first end 154 of the body 152 of the device 150 to the second end 124 of the grout port 120, as described above. FIG. 4B shows the device 150 coupled to the grout port 120 via a check valve device 190. The check valve device 190 has a first end 192 and a second end 194 opposite and spaced apart from the first end 192 of the check valve device 190. The first end 192 of the check valve device 190 is coupled to the second end 124 of the grout port 120, and the second end 194 of the check valve device 190 is removably coupled to the first opening 154 of the body 152 of the device 150. The check valve device 190 allows the flow of grout 199 from the first end 192 of the check valve device 190 to the second end 194 of the check valve device 190 and prevents the flow of grout 199 from the second end 194 of the check valve device 190 to the first end 192 of the check valve device 190.

In use, the check valve device 190 allows the flow of grout 199 from the grout port 120 to the device 150. After the channel 116 of the grout sleeve 110 has been filled with grout 199, the device 150 is decoupled from the check valve device 190, but the check valve device 190 remains coupled to the second end 124 of the grout port 120. Because the check valve device 190 prevents the flow of any fluid from the second end 194 of the check valve device 190 to the first end 192 of the check valve device 190, the decreased pressure within the grout port 120 created by the device 150 is maintained. The decreased pressure within the grout port 120 prevents the grout 199 from flowing back out of the grout sleeve 110 and back into the joint 108. The check valve device 190 is removable once the grout is at least partially cured.

As seen in FIG. 4B, the check valve device 190 is a swing check valve, but in other implementations, the first one-way valve and second one-way valve are ball check valves, lift check valves, or any other type of one-way or check valve capable of allowing the flow of grout in one direction and preventing the flow of grout in the opposite direction.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

What is claimed is:

1. A grout pump system, the system comprising:
   a first concrete element including an embedded grout sleeve and a grout port, the grout sleeve defining a channel and the grout port being in fluid communication with the channel;
   a second concrete element including a rod extending from the second concrete element, the rod being disposable within the channel of the grout sleeve; and
   a device for pumping grout, the device comprising:
      a body defining a first opening, a second opening, and a third opening, each of the first, second, and third openings being in fluid communication with each other, wherein the first opening includes a first one-way valve configured to allow a flow of grout into the body through the first opening toward the second and third openings, and the second opening includes a second one-way valve configured to allow the flow of grout away from the first and third openings and out of the body through the second opening, and
      a pump sealingly and removably coupled to the third opening and in fluid communication with the first and second openings, the pump being configured to increase and decrease pressure within the body to cause the flow of grout from the first opening to the second opening,
   wherein the first opening of the device is couplable to the grout port,
   wherein, when the pump decreases pressure within the body, the second one-way valve is closed and the pump causes the grout to flow in a first direction (i) from the channel of the grout sleeve towards the first opening of the body via the grout port, and (ii) from the first opening towards the third opening of the body, and through the first one-way valve, and
   wherein, when the pump increases pressure within the body, the first one-way valve is closed and the pump causes the grout to flow in a second direction from the third opening towards the second opening and through the second one-way valve.

2. The system of claim 1, wherein the first one-way valve and the second one-way valve are swing check valves.

3. The system of claim 1, wherein the first one-way valve and the second one-way valve are ball check valves.

4. The system of claim 1, wherein the first one-way valve and the second one-way valve are lift check valves.

5. The system of claim 1, further comprising a pump tube having a first end and a second end opposite and spaced apart from the first end, wherein the pump is couplable to the first end of the pump tube and the third opening of the device is couplable to the second end of the pump tube.

6. The system of claim 1, further comprising a check valve device having a first end and a second end opposite and spaced apart from the first end, wherein the check valve allows the flow of grout from the first end to the second end, wherein the grout port is couplable to the first end of the check valve device, and the first opening of the device is removably couplable to the second end of the check valve device.

7. The system of claim 1, further comprising an outlet tube having a first end and a second end opposite and spaced apart from the first end, the first end being couplable to the second opening of the device.

8. A method of using the grout pump system of claim 1, the method comprising:
- positioning the first concrete element adjacent the second concrete element, wherein the rod is disposed within the channel of the grout sleeve, and a joint is defined between adjacent faces of the first and second concrete elements;
- at least partially filling the joint with grout;
- coupling the device for pumping grout to the grout port of the first concrete element; and
- activating the pump to increase or decrease the pressure within the body to cause the flow of grout in the second direction or the first direction.

9. The method of claim 8, wherein the first one-way valve and the second one-way valve are swing check valves.

10. The method of claim 8, wherein the first one-way valve and the second one-way valve are ball check valves.

11. The method of claim 8, wherein the first one-way valve and the second one-way valve are lift check valves.

12. The method of claim 8, wherein the pump is coupled to a first end of a pump tube and the third opening is coupled to a second end of the pump tube.

13. The method of claim 8, further comprising an outlet tube having a first end and a second end opposite and spaced apart from the first end, the first end being couplable to the second opening of the device.

14. The method of claim 8, wherein grout flowing from the second opening of the device flows into the joint.

15. The method of claim 8, wherein coupling a device for pumping grout to the grout port of the first concrete element further comprises coupling the grout port to a first end of a check valve device, and removably coupling the first opening of the device to a second end of the check valve device, wherein the second end of the check valve device is opposite and spaced apart from the first end, and the check valve allows the flow of grout from the first end to the second end.

16. The method of claim 15, further comprising, after activating the pump, decoupling the first opening of the device from the second end of the check valve device.

* * * * *